US008687087B2

(12) United States Patent  
Pertsel et al.

(10) Patent No.: US 8,687,087 B2  
(45) Date of Patent: Apr. 1, 2014

(54) DIGITAL CAMERA WITH SELECTIVELY INCREASED DYNAMIC RANGE BY CONTROL OF PARAMETERS DURING IMAGE ACQUISITION

(75) Inventors: Shimon Pertsel, Sunnyvale, CA (US); Ohad Meitav, Cupertino, CA (US); Eli Pozniansky, Santa Clara, CA (US); Erez Galil, Mountain View, CA (US)

(73) Assignee: CSR Technology Inc., San Jose, CA (US)

( * ) Notice: Subject to any disclaimer, the term of this patent is extended or adjusted under 35 U.S.C. 154(b) by 847 days.

(21) Appl. No.: 11/756,733

(22) Filed: Jun. 1, 2007

(65) Prior Publication Data

US 2008/0055426 A1 Mar. 6, 2008

Related U.S. Application Data

(63) Continuation-in-part of application No. 11/467,993, filed on Aug. 29, 2006, now Pat. No. 7,714,903.

(51) Int. Cl.
  *H04N 5/235* (2006.01)
  *H04N 5/20* (2006.01)

(52) U.S. Cl.
  USPC .................................... 348/229.1; 348/255

(58) Field of Classification Search
  USPC .................... 348/229.1, 230.1, 255, 256, 257
  See application file for complete search history.

(56) References Cited

U.S. PATENT DOCUMENTS

| | | | |
|---|---|---|---|
| 4,779,137 A | 10/1988 | Tojo et al. | |
| 5,335,075 A | 8/1994 | Komiya et al. | |
| 5,712,682 A | 1/1998 | Hannah | |
| 5,872,596 A | 2/1999 | Yanai et al. | |
| 5,892,541 A | 4/1999 | Merrill | |
| 6,011,251 A | 1/2000 | Dierickx et al. | |
| 6,018,365 A | 1/2000 | Merrill | |

(Continued)

FOREIGN PATENT DOCUMENTS

| | | |
|---|---|---|
| EP | 1538827 A | 6/2005 |
| WO | WO-9717800 A1 | 5/1997 |

(Continued)

OTHER PUBLICATIONS

EPO/ISA, "Notification of Transmittal of the International Search Report and the Written Opinion of the International Searching Authority, or the Declaration", mailed Jan. 22, 2008 in corresponding PCT/US2007/076904, 13 pages.

(Continued)

*Primary Examiner* — Albert Cutler  
(74) *Attorney, Agent, or Firm* — Frommer Lawrence & Haug LLP; John W. Branch

(57) ABSTRACT

A parameter of a digital camera or other digital image acquisition device is adjusted to maintain the resulting digital signal within a range carried by a digital processing path that carries a limited number of bits. The magnitude of the parameter is then also used to represent the image. Examples of the parameter include analog signal gain and exposure time. This is a cost effective way to increase the dynamic range of a digital camera, instead of increasing the width of its digital processing path. The digital data may be processed to obtain either tone mapped images, which are compatible with current cameras and other equipment, or to obtain images with a greater dynamic range for use with suitable displays and the like.

59 Claims, 8 Drawing Sheets

(56) References Cited

U.S. PATENT DOCUMENTS

| | | | |
|---|---|---|---|
| 6,115,065 | A | 9/2000 | Yadid-Pecht et al. |
| 6,278,490 | B1 | 8/2001 | Fukuda et al. |
| 6,441,848 | B1 | 8/2002 | Tull |
| 6,642,503 | B2 | 11/2003 | Kummaraguntla et al. |
| 6,771,312 | B2 | 8/2004 | Kamishima et al. |
| 6,774,941 | B1 | 8/2004 | Boisvert et al. |
| 6,791,716 | B1 | 9/2004 | Buhr et al. |
| 6,894,720 | B2 * | 5/2005 | Zhang ........................ 348/222.1 |
| 6,906,751 | B1 | 6/2005 | Norita et al. |
| 6,919,549 | B2 | 7/2005 | Bamji et al. |
| 6,922,209 | B1 | 7/2005 | Hwang et al. |
| 6,946,635 | B1 | 9/2005 | Pine |
| 6,968,093 | B1 | 11/2005 | Boisvert et al. |
| 6,977,685 | B1 | 12/2005 | Acosta-Serafini et al. |
| 7,023,580 | B2 | 4/2006 | Zhang et al. |
| 7,038,720 | B2 | 5/2006 | Rogers et al. |
| 7,050,091 | B2 | 5/2006 | Tull |
| 7,221,396 | B2 | 5/2007 | Lenz |
| 7,297,917 | B2 | 11/2007 | Olsen et al. |
| 7,554,071 | B2 | 6/2009 | Moholt |
| 7,605,852 | B2 | 10/2009 | Olsen et al. |
| 7,667,176 | B2 | 2/2010 | Olsen et al. |
| 7,741,589 | B2 | 6/2010 | Moholt et al. |
| 2002/0067415 | A1 | 6/2002 | Denyer et al. |
| 2002/0154232 | A1 | 10/2002 | Tull |
| 2003/0076432 | A1 | 4/2003 | Luo et al. |
| 2005/0057670 | A1 | 3/2005 | Tull et al. |
| 2005/0078205 | A1 | 4/2005 | Hynecek |
| 2005/0168623 | A1 * | 8/2005 | Stavely et al. ................. 348/362 |
| 2005/0174439 | A1 * | 8/2005 | Komagamine ............. 348/222.1 |
| 2005/0248666 | A1 * | 11/2005 | Kim et al. .................. 348/230.1 |
| 2005/0253937 | A1 | 11/2005 | Moholt et al. |
| 2005/0253944 | A1 | 11/2005 | Olsen et al. |
| 2005/0259167 | A1 | 11/2005 | Inoue et al. |
| 2006/0028579 | A1 * | 2/2006 | Sato .............................. 348/362 |
| 2006/0055795 | A1 * | 3/2006 | Nakai et al. ................. 348/229.1 |
| 2006/0209204 | A1 | 9/2006 | Ward |
| 2006/0214085 | A1 | 9/2006 | Olsen et al. |
| 2007/0046799 | A1 | 3/2007 | Moholt |
| 2007/0181779 | A1 | 8/2007 | Olsen et al. |
| 2007/0257183 | A1 | 11/2007 | Moholt et al. |
| 2009/0244348 | A1 | 10/2009 | Moholt |
| 2010/0073512 | A1 | 3/2010 | Olsen et al. |

FOREIGN PATENT DOCUMENTS

| | | |
|---|---|---|
| WO | WO 99/60524 | 11/1999 |
| WO | WO 00/38409 | 6/2000 |
| WO | 2008/027840 A1 | 3/2008 |
| WO | WO-2008027840 A1 | 3/2008 |

OTHER PUBLICATIONS

Ashikhmin, Michael, "A Tone Mapping Algorithm for High Contrast Images", Thirteenth Eurographics Workshop on Rendering, 2002, pp. 145-155.

Biswas, K.K., et al., "A Simple Spatial Tone Mapping Operator for High Dynamic Range Images", School of Computer Science, University of Florida, 2005, 6 pages.

Irawan, Piti, et al., "Perceptually Based Tone Mapping of High Dynamic Range Image Streams". Eurographics Symposium on Rendering, 2005, 12 pages.

Ward, Greg, et al., "Subband Encoding of High Dynamic Range Imagery", ACM International Conference Proceeding Series; vol. 73, 2004, pp. 1-8.

International Search Report and the Written Opinion of the International Searching Authority, of the Declaration for International Application for International Application PCT/US2007/076904, mailed Jan. 22, 2008, 11 pages.

International Search Report and the Written Opinion of the International Searching Authority, or the Declaration for the International Application PCT/US 2007/076904, mailed Jun. 26, 2008, 11 pages.

Ashikhmin, Michael, "A Tone Mapping Algorithm for High Contrast Images", Thirteenth Eurographics Workshop on Rendering, 2002, p. 145-155.

Bennett, Eric P., et al., "Fine Feature Preservation in HDR Tone Mapping", The university of North Carolina at Chapel Hill, Dept. of Computer Science, 2006, 1 page.

Biswas, K.K., et al., "A Simple Spatial Time Mapping Operator for High Dynamic Range Images", School of Computer Science, University of Florida 2005, 6 pages.

Irawan, Pitti, et al., "Perceptually Based Tone Mapping og High Dynamic Range Image Streams", Eurographics Symposium on Rendering, 2005, 12 pages.

Reinhard, Erik, et al., "Photographic Tone Reproduction for Digital Images", 2002, 10 pages.

Ward, Greg, et al., "Subband Encoding of High Dynamic Range Imagery", ACM International Conference Proceeding Series, vol. 73, 2004, pp. 1-8.

Park, S. H. et al., "Evaluating Tone Mapping Algorithms for Rendering Non-Pictorial (Scientific) High-Dynamic-Range Images," ACM Transactions on Applied Perception, vol. V, No. N, Dec. 18, 2006, pp. 1-22.

Ward, G., "High Dynamic Range Image Encodings," Anyhere Software, May 21, 2001, 28 pages.

* cited by examiner

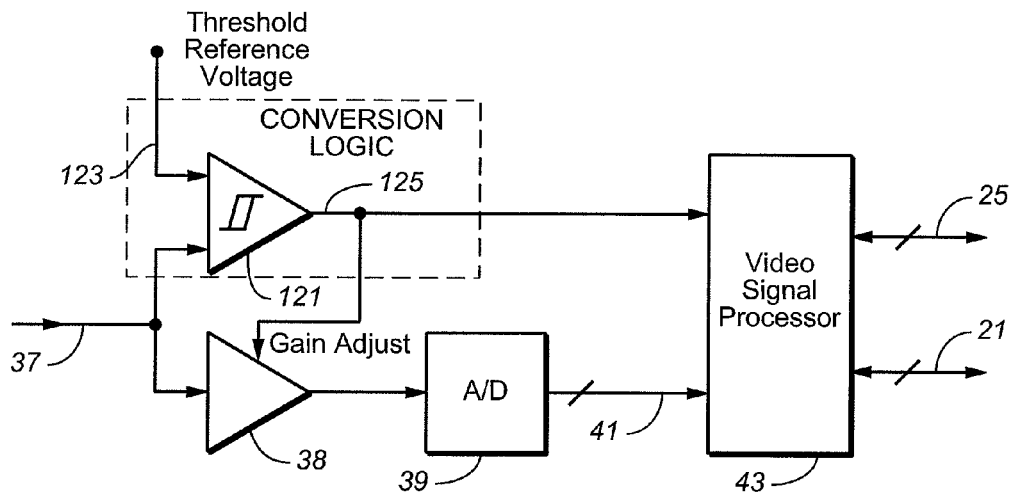
FIG. 5
FIG. 6
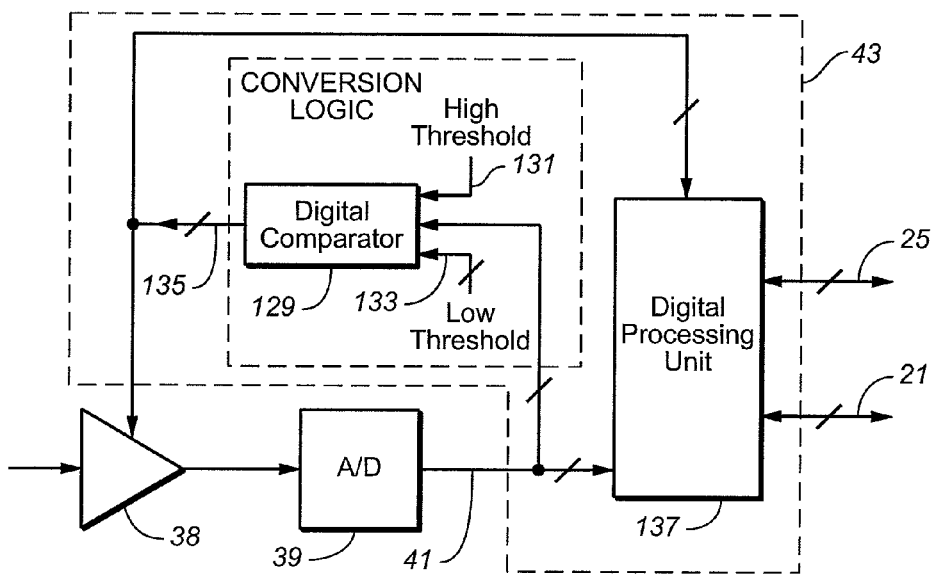
FIG. 7

DIGITAL CAMERA WITH SELECTIVELY INCREASED DYNAMIC RANGE BY CONTROL OF PARAMETERS DURING IMAGE ACQUISITION

CROSS-REFERENCE TO RELATED APPLICATION

This is a continuation-in-part of U.S. patent application Ser. No. 11/467,993, filed by Shimon Pertsel and Ohad Meitav on Aug. 29, 2006 now U.S. Pat. No. 7,714,903, entitled "Wide Dynamic Range Image Capturing System Method and Apparatus."

BACKGROUND

This application relates to automatic control of digital cameras and other electronic digital image acquisition devices, and the use of visual data generated by them, in a manner that selectively increases the dynamic range of the cameras or other devices.

Electronic cameras image scenes onto a two-dimensional sensor such as a charge-coupled-device (CCD), a complementary metal-on-silicon (CMOS) device or other type of light sensor. These devices include a large number of photo-detectors (typically two, three, four or more million) arranged across a small two dimensional surface that individually generate a signal proportional to the intensity of light or other optical radiation (including infrared and ultra-violet regions of the spectrum adjacent the visible light wavelengths) striking the element. These elements, forming pixels of an image, are typically scanned in a raster pattern to generate an analog signal with a time varying magnitude representative of the intensity of radiation striking one sensor element after another as they are scanned. Color data are most commonly obtained by using photo-detectors that are sensitive to each of distinct color components (such as red, green and blue), alternately distributed across the sensor.

A popular form of such an electronic camera is a small hand-held digital camera that records data of a large number of picture frames either as still photograph "snapshots" or as sequences of frames forming a moving picture. A significant amount of image processing is typically performed on the data of each frame within the camera before storing on a removable non-volatile memory such as a magnetic tape cartridge, a flash memory card, a recordable optical disc or a removable hard disk drive. The processed data are typically displayed as a reduced resolution image on a liquid crystal display (LCD) device on the outside of the camera. The processed data are also typically compressed before storage in the non-volatile memory in order to reduce the amount of storage capacity that is taken by the data for each picture frame.

The data acquired by the image sensor are typically processed to compensate for imperfections of the camera and to generally improve the quality of the image obtainable from the data. The correction for any defective pixel photodetector elements of the sensor is one processing function. Another is white balance correction wherein the relative magnitudes of different pixels of the primary colors are set to represent white. This processing may also include de-mosaicing the individual pixel data, when obtained from a type of sensor having spatially separate monochromatic pixel detectors, in order to render superimposed multi-colored pixels in the image data. This de-mosaicing then makes it desirable to process the data to enhance and smooth edges of the image. Compensation of the image data for noise and variations of the camera optical system across the image and for variations among the sensor photodetectors is also typically performed within the camera. Other processing typically includes one or more of gamma correction, contrast stretching, chrominance filtering and the like.

Electronic cameras also nearly always include an automatic exposure control capability that sets the exposure time, size of its aperture opening and analog electronic gain of the sensor to result in the luminescence of the image or succession of images being at a certain level based upon calibrations for the sensor being used and user preferences. These exposure parameters are calculated in advance of the picture being taken, and then used to control the camera during acquisition of the image data. For a scene with a particular level of illumination, a decrease in the exposure time is made up by increasing the size of the aperture or the gain of the sensor, or both, in order to obtain the data within a certain luminescence range. An increased aperture results in an image with a reduced depth of field and increased optical blur, and increasing the gain causes the noise within the image to increase. Conversely, when the exposure time can be increased, such as when the scene is brightly lighted, the aperture and/or gain are reduced, which results in the image having a greater depth of field and/or reduced noise. In addition to analog gain being adjusted, or in place of it, the digital gain of an image is often adjusted after the data have been captured.

Digital camera systems typically have a limited dynamic range. While film cameras typically provide images with intensity dynamic ranges ranging from 70 dB to 80 dB, current digital cameras typically offer dynamic ranges of less than 60 dB. One cause of this is the use of digital processing paths within the cameras that are limited in the number of bits they can carry. The cost of a digital camera can increase rapidly as the width of digital processing paths is increased. As the number of bits of data that an analog-to-digital converter or digital signal processor can process increases, as an example, the cost of a camera can increase significantly. The dynamic range of digital cameras is therefore typically maintained lower than that which can be obtained by film cameras in order to be cost competitive.

This often results in one or more regions of an image having a wide intensity dynamic range being saturated, either positively or negatively, or both. Any details of the image in saturated regions are lost since these regions are uniformly bright or dark, respectively.

SUMMARY

It is therefore desirable to be able to increase the dynamic range of digital cameras and other electronic digital image acquisition devices without increasing the widths of their digital processing paths. This may be accomplished by controlling a parameter that makes sure that the image signal remains within the range of the digital processing path when being captured, in order to avoid the effects of saturation. That is, if a digital processing path is 8, 10 or 12 bits wide, for example, the image data are captured within a range that may be represented by such a number of bits. The image is therefore represented by these data plus values of the parameter during acquisition of the data.

In embodiments described hereinafter, the controlled parameter is the analog signal gain of an amplifier in the front end of the camera. If the signal is too high, it is reduced by an amount to bring it down to within the range, and if too low, the signal is increased by an amount that brings it up to within the range. The amount of any reduction or increase then becomes part of the data of the image that are recorded along with the digital representation of the signal within the range.

The luminance values of the image signals over a wide dynamic range of interest are, in effect, shifted to levels within a smaller window of luminance values that is defined by limitations of the image acquisition and/or signal processing systems. The amount of the signal shift, preferably made in increments equal to the luminance range of the window, then also becomes part of the data representing the image. This signal adjustment may be made independently for each pixel of an image, or, alternatively, made the same for groups of adjacent pixels. Since, in a typical digital camera, an analog-to-digital converter translates an analog signal from a photosensor into the digital domain, and in large measure sets the limited luminance value range window size, the signal adjustment is preferably implemented, in such imaging systems, by controlling the gain of an amplifier at the input to the analog-to-digital converter.

An image having the wide dynamic range of interest may then be reconstructed from the luminance value within the window and the amount of signal shift. In digital camera embodiments, portions of the image having luminance levels outside of the defined window may be reconstructed from both the analog-to-digital converter output and the gain data rather than being saturated. Details in a portion of the image that would otherwise be saturated by the camera, and thus have a uniform white or black intensity, are now viewable. This is because the camera gain is adjusted to maintain the signal level within the range of the camera digital processing paths. When forming an image from data obtained from the camera digital processing paths, intensity values are adjusted by the amount of gain to which the amplifier in that path was set when acquiring these data. Since a typical digital camera automatically sets the exposure based upon an average luminance of all or a portion of the image, there are typically only small amounts of the image that need to be shifted and processed in this way.

As with standard cameras, it is desired to perform at least some processing of the image data before they are stored or otherwise outputted from the camera. But the representation of image pixel luminance levels by separate luminance and gain quantities is not what commonly used image processing algorithms have been designed to process. Examples are algorithms to de-mosaic the image, adjust image white balance and reduce image noise. If data of an image having the full desired dynamic range is first formed within the camera from the separate quantities, these data may then be processed with such algorithms in the usual way. But the formation of images with such a wide dynamic luminance range requires that the camera has the capability of handling them, which requires more processing, more memory and perhaps a wider system bus than included in the current typical digital camera. Therefore, in order to avoid this, the image processing algorithms may be applied to just the data coming from the analog-to-digital converter within the luminance range window. It has been found to be unnecessary to employ the absolute luminance values of the pixels for processing the images with such algorithms. Luminance data from contiguous pixels with the same associated gain values are processed together. After processing, the image pixel values are represented by the processed image data and their associated gain values.

The data from the analog-to-digital converter and the amplifier gain may also be used within the camera to generate data of a tone mapped image. Such an image has a dynamic range that is less than the wide dynamic range that is described in the immediately preceding paragraph but does contain details of the images in regions that would normally be saturated by the camera. Prior art tone mapped images have been formed from high dynamic range (HDR) images in order to display properly on a more limited dynamic range of a video monitor or other display device. Here, the tone mapped images are instead formed from high dynamic range data acquired within a low dynamic range camera. The tone mapped images may then be processed and utilized by existing algorithms and devices designed to work with the low dynamic range camera. But if it is desired to obtain HDR images, the tone mapped image data may later be combined with the gain data. Images having either a high or a low dynamic range may thus be obtained from camera data, depending upon the devices used to process the data or display the images, and the desire of the user.

In other embodiments described in the above-referenced application Ser. No. 11/467,993, the parameter is related to the duration of the exposure that is controlled to maintain the signal within the range of the camera. If the signal that would result from an exposure of a portion of the image for the full exposure time period is too high, a measurement is taken before the end of the exposure time period, while the signal is within the defined range. The time during the exposure at which the luminance value is measured, or the relationship of the exposure time to the full exposure time period, then becomes part of the data of the image that are recorded along with the digital representation of the signal within the range. The luminance values within such an image portion are then reconstructed by increasing the individual measured luminance values by a factor proportional to the relationship of the actual exposure time to the full exposure time period. Typically, only a small part of an image needs to be processed in this manner, since data of most of an image are usually captured during the full exposure time.

The data acquired in these other embodiments, namely luminance values and corresponding time data, are similar in form to the data acquired in the embodiments primarily described in the present application, which include luminance values and corresponding gain data. The luminance and time data form may therefore be processed and utilized in many of the ways described herein for data in the form of luminance and associated gain data.

It will also be noted that the data representation and processing techniques described herein are not limited to use with luminance data from a photosensor but rather can also be applied generally to other continuums of magnitudes that are divided into discrete ranges, either because of device limitations, such as the limited bandwidth of the cameras described above, or for some other reason. The magnitudes may be represented by values within the individual ranges plus an identification of the ranges in which the values lie. The data within the individual ranges may be processed separately, and the processed data of the individual ranges then combined with each other and with the identity of the corresponding ranges in which the data lay before processing. These processes are described hereinafter, as examples, for implementation with digital cameras.

Additional aspects, advantages and features of the present invention are included in the following description of exemplary examples thereof, which description should be taken in conjunction with the accompanying drawings.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

BRIEF DESCRIPTION OF THE DRAWINGS

FIG. 5 is a table of values generated by operation of the device of FIG. 1 according to the flowchart of FIG. 2;

FIG. 6 is a circuit diagram that illustrates a second embodiment for controlling the saturation of acquired image data, an analog control circuit that may be included in the device of FIG. 1;

FIG. 7 is a circuit diagram that illustrates a third embodiment for controlling the saturation of acquired image data, a digital control circuit that may be included in the device of FIG. 1;

DETAILED DESCRIPTION OF EXEMPLARY EMBODIMENTS

Electronic Camera Example

Figure 1:
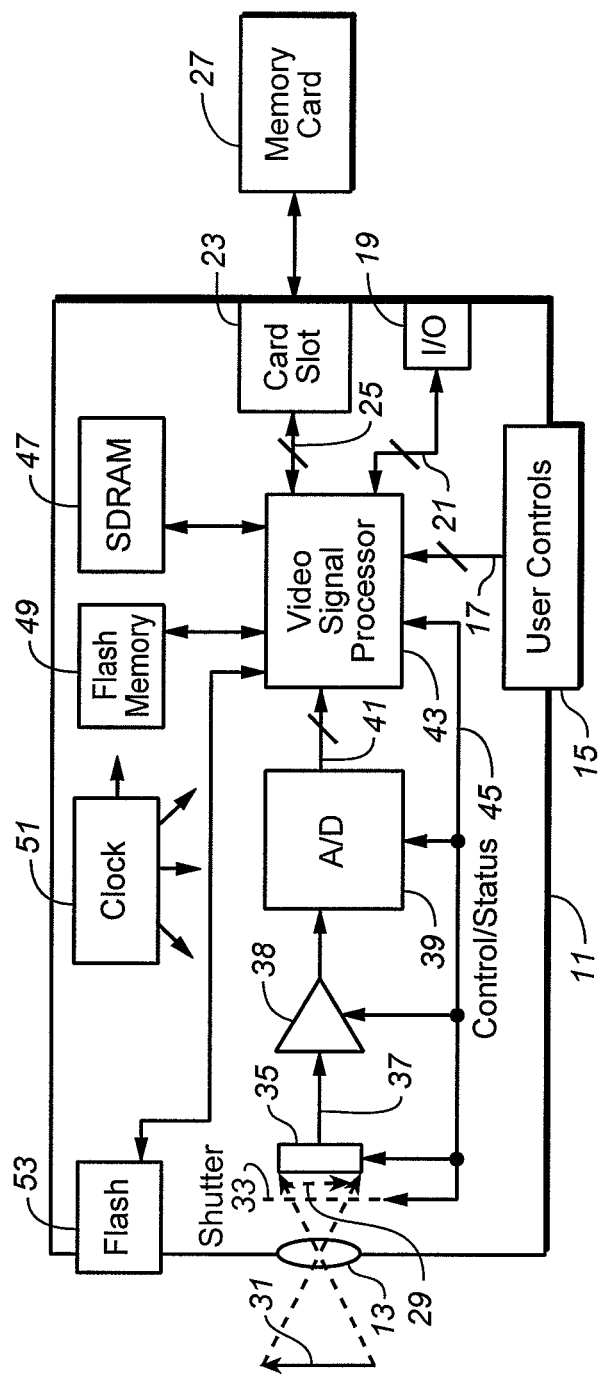
FIG. 1 is a block diagram of a camera or other video acquisition device that includes selective control of analog signal gain.

In FIG. 1, an example of a camera in which the present invention may be implemented is schematically shown, which may be a still camera or a video camera. It includes a case 11, an imaging optical system 13, user controls and indicators 15 that generate and receive control signals 17, a video input-output receptacle 19 with internal electrical connections 21, and a card slot 23, with internal electrical connections 25. A non-volatile memory card 27 is removably inserted into the card slot 23. Data of images captured by the camera may be stored on the memory card 27 or in an internal non-volatile memory (not shown). Image data may also be outputted to another video device through the receptacle 19. The memory card 27 can be a commercially available semiconductor flash memory, small removable rotating magnetic disk or other non-volatile memory to which image and/or video data can be written by the camera.

The optical system 13 can be a single lens, as shown, but will normally be a set of lenses. An image 29 of a scene 31 is formed in visible optical radiation through an aperture 32 and a shutter 33 onto a two-dimensional surface of an image sensor 35. A motive element 34 moves one or more elements of the optical system 13 to focus the image 29 on the sensor 35. An electrical output 37 of the sensor carries an analog signal resulting from scanning individual photo-detectors of the surface of the sensor 35 onto which the image 29 is projected. The sensor 35 typically contains a large number of individual photo-detectors arranged in a two-dimensional array of rows and columns to detect individual pixels of the image 29. Signals proportional to the intensity of light striking the individual photo-detectors are obtained in the output 37 in time sequence, typically by scanning them in a raster pattern, where the rows of photo-detectors are scanned one at a time from left to right, beginning at the top row, to generate a frame of image data from which the image 29 may be reconstructed. The analog signal 37 is applied through a variable gain amplifier 38 to an analog-to-digital converter circuit chip 39 that generates digital data in circuits 41 of the image 29. Typically, the signal in circuits 41 is a sequence of individual words of digital data representing the intensity of light striking the individual photo-detectors of the sensor 35.

The photo-detectors of the sensor 35 typically detect the intensity of the image pixel striking them in one of two or more individual color components. Early sensors detected only two separate colors of the image. Detection of three primary colors, such as red, green and blue (RGB) components, is now common. Currently, image sensors that detect more than three color components are becoming available.

Processing of the image data in circuits 41 and control of the camera operation are provided, in this embodiment, by a single integrated circuit chip 43 (which may also include the analog-to-digital converter instead of using the separate circuit chip 39). The circuit chip 43 may include a general purpose processor that executes algorithms defined by stored firmware. These functions may be implemented by several integrated circuit chips connected together but a single chip is preferred. In addition to being connected with the circuits 17, 21, 25 and 41, the circuit chip 43 is connected to control and status lines 45. The lines 45 are, in turn, connected with the aperture 32, shutter 33, focus actuator 34, sensor 29, controllable gain analog amplifier 38, analog-to-digital converter 39 and other components of the camera to provide synchronous operation of them. Signals in the lines 45 from the processor 43 drive the focus actuator 34 and set the size of the opening of the aperture 32, as well as operate the shutter 33. The gain of the analog signal path may also set by the processor 43 through the lines 45. Signal gain is typically controllable in the analog-to-digital converter which, in the case of a CCD sensor, is part of the sensor, or in the case of a CMOS sensor, is part of a separate analog-to-digital converter as shown in FIG. 1. Use of a separate controllable gain analog amplifier 38 increases the amount of control that is possible over the signal gain in the analog front end (AFE) of the camera.

A separate volatile random-access memory circuit chip 47 is also connected to the processor chip 43 through lines 48 for temporary data storage. Also, a separate non-volatile memory chip 49, connected to the processor chip 43 through lines 50, may be included for storage of a processor program or firmware, calibration data and the like. The memory 49 may be flash memory, which is re-programmable, or a memory that is programmable only once, such as a masked programmable read-only-memory (PROM) or an electrically programmable read-only-memory (EPROM). A usual clock circuit 51 is provided within the camera for providing clock signals to the circuit chips and other components. Rather than a separate component, the clock circuit for the system may alternatively be included on the processor chip 43.

A source 53 of artificial illumination, such as a flash Lamp or other source of light pulses, is preferably built into the camera case 11. The source 53 operates in response to control signals from the processor 43 through control lines 55. The light source 53 may be a xenon flash lamp or a white light-emitting-diode (LED). The processor 43 preferably controls the timing and other aspects of the light source 53.

The controllable gain amplifier 38 may be included as part of the sensor 35, part of the analog-to-digital converter 39, or as a circuit that is separate from these, which is what is shown. The gain of the amplifier 38 is typically controlled by the processor 43 as one of several parameters that are automatically set prior to taking a picture of an object scene illuminated with a given light level. Other such parameters include the duration of the exposure (shutter speed) and the size of the aperture opening. Additionally, the gain of the amplifier is adjusted herein to effectively expand the dynamic range of the system in order to minimize or avoid saturation of the image. Positive or negative saturation, or both, are controlled in this way, as explained below with respect to specific embodiments.

Image data acquired by a digital camera such as illustrated in FIG. 1 are typically processed to compensate for imperfections of the camera and to generally improve the quality of the image obtainable from the data. The correction for any defective pixel photodetector elements of the sensor is one processing function that may be performed. Another is white balance correction wherein the relative magnitudes of different pixels of the primary colors are set to represent white. Compensation of the image data for noise and variations of the camera optical system across the image and for variations among the sensor photodetectors may also be performed. Other processing typically includes one or more of gamma correction, contrast stretching, chrominance filtering and the like.

This processing may also include de-mosaicing the individual pixel data to superimpose data from spatially separate monochromatic pixel detectors of the sensor 35 to render superimposed multi-colored pixels in the image data. Such a sensor is in common use, is known as Bayer sensor. De-mosaicing combines separate red, green and blue outputs of adjacent detectors to form signals of individual pixels of the image. De-mosaicing then makes it desirable to further process the data to enhance and smooth edges of the image. Another type of available sensor has individual sensors for the primary colors superimposed, known as the Foveon sensor, so de-mosaicing processing of its output data is unnecessary. Another sensing technique is to use a sensor with a single set of broad light spectrum photodetectors, one for each pixel, and then position a rotating color wheel in front of the sensor. The individual photodetectors then receive the multiple primary colors in sequence. De-mosaicing processing is also unnecessary with this approach.

The processed data are then usually compressed within the camera by use of a commercially available algorithm before storage in a non-volatile memory.

First Saturation Control Embodiment

Digital Processing

In one embodiment of a technique that controls the amount of saturation within an image, data of two images of a scene are acquired in rapid succession. Both images are preferably taken with the same exposure parameters, such as exposure duration, the size of the aperture and the gain of the signal path. These are typically set automatically within the camera or other video data acquisition device in response to measurement of at least the luminescence of the scene that is made by the camera. The first image is used to determine whether any areas of the image are saturated, and, if so, this information is utilized to set the amount of signal gain within the camera that is used to acquire data of a second image in these areas. The gain is set to a level that reduces, or even eliminates, the effects of the saturation encountered in the first image. It is the second image that is recorded. Data of the first image may be discarded after they have been used to set the gain. The first image may be a reduced resolution preview image and the second image a full resolution image whose data are retained for later viewing of the image of the scene. More than one preview image may be acquired, although use of the preview image taken immediately prior to the final image is preferred for saturation correction. Two or more preview images may be taken in order to perform other functions, such as setting the exposure parameters for taking the final image, correcting for motion of the camera within the scene being photographed or to control the flash lamp.

Figure 2:
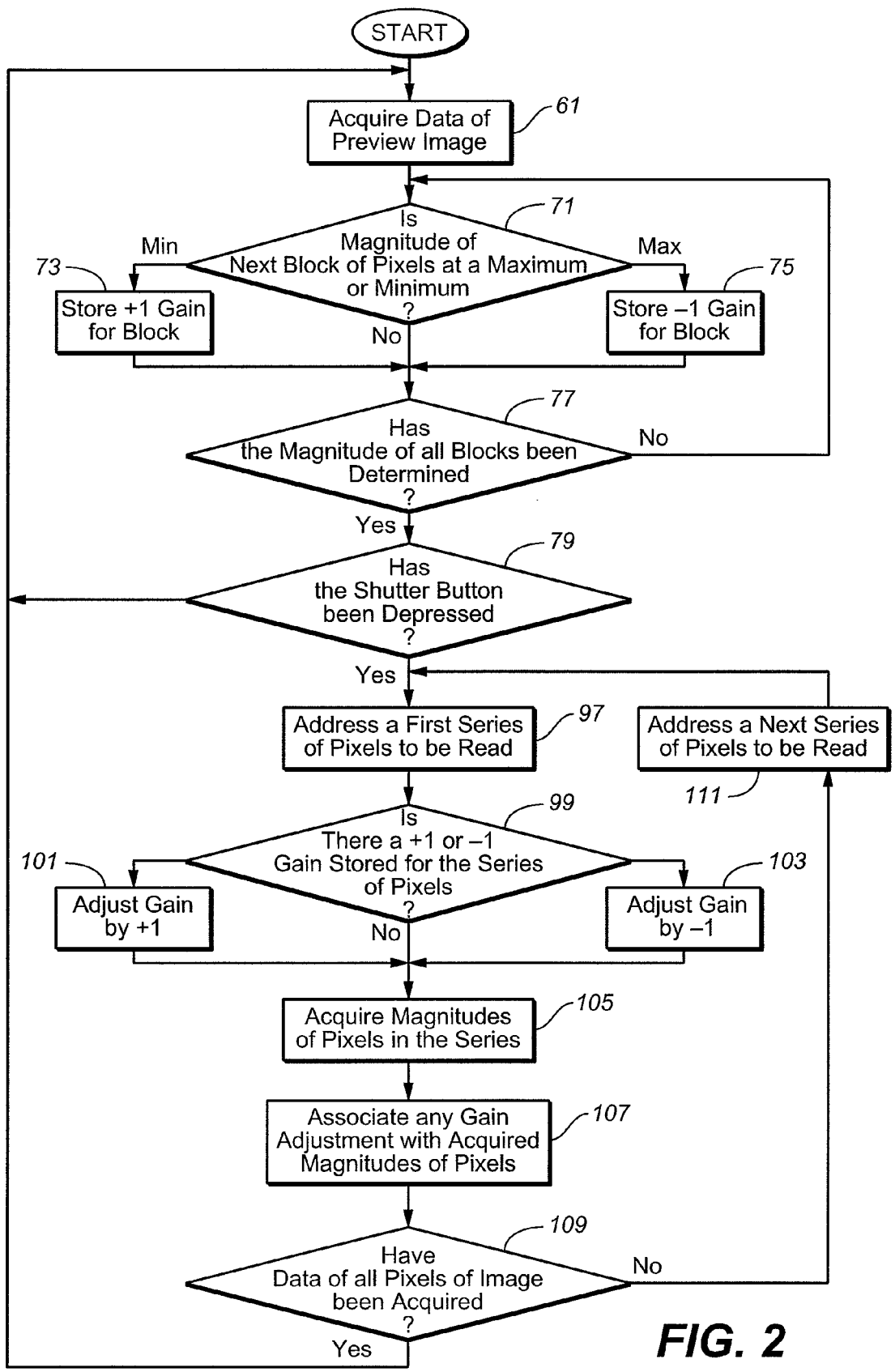
FIG. 2 is a flowchart that illustrates a first embodiment for controlling the saturation of acquired image data, which shows operation of the device of FIG. 1 to control its analog signal gain.

Referring to FIG. 2, a process that may be implemented by the signal processor 43 (FIG. 1) to correct for image saturation is described. When power is applied to the camera, it acquires data of a succession of preview images until the shutter button is pressed by the user, at which time information from the most recently taken preview image is used to set the camera for recording the final image with saturation correction. The act of acquiring data of a preview image is indicated at 61 in FIG. 2.

Figure 3:
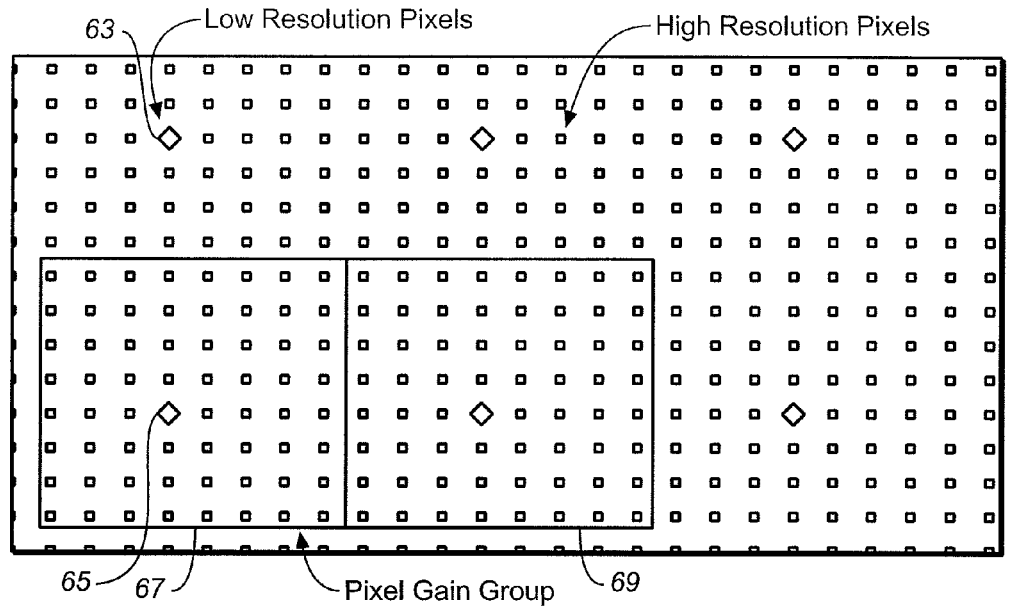
FIG. 3 illustrates types and grouping of image pixels as used by the device of FIG. 1.

FIG. 3 shows some of the pixels of an image frame, represented individually by square dots. Data of the pixels are typically obtained within the sensor 35 (FIG. 1) for a full resolution image by scanning across a row, then proceeding to an adjacent row, and so on until data of all the pixels of the frame have been acquired. But rather than using the data of all the pixels from the preview image to identify its saturated regions, a lesser amount of data is preferably utilized to represent a preview image of reduced resolution. This reduces the amount of processing that is necessary to identify saturated regions and therefore takes less time to perform.

There are two ways illustrated in FIG. 3 to reduce the amount of image data. One is to acquire data of only a few of the pixels that are evenly distributed over the image. Pixels 63 and 65 are examples. Data are acquired for every eighth pixel along a row, and this is done for every eighth row across the image frame, in this example. The data of one pixel are taken to represent the value of each pixel within a block that includes the one pixel. Alternatively, data of all the pixels within a defined area, such as those within each of adjacent blocks 67 and 69, may be averaged to come up with a single set of values that are used to represent all the pixels within a block. Each block contains 64 pixels in this specific example. This is done for each block across the image, and the average values are then used for processing to determine whether saturation exists.

Returning to FIG. 2, it is determined at 71, for a first block of pixels, whether its magnitude (either for one central pixel or an average of all pixels in the block) is at a maximum or minimum of a range of signal levels that can be handled by the analog-to-digital converter 39, the bus 41 and/or the signal processor 43. If so, it is highly likely that the value for that block is outside the range of values that can be processed, thereby in saturation, and therefore does not represent the true magnitude of the image in that block. If the signal value for the block is at a minimum, a +1 gain value is temporarily stored in a camera memory for that block, as indicated at 73. This indicates that the gain of the amplifier 38 (FIG. 1) is to be increased by a +1 increment when data of the pixels in that particular block are subsequently acquired as part of the final image. If the signal value for the block is at a maximum, on the other hand, a −1 gain value is stored, at 75. If the block signal value is within the range, either nothing need be done or a 0 indication may be stored.

This process is performed for each block of pixels across the preview image frame. After the functions 71, 73 and 75 have been completed for the first block, it is determined at 77 that they need to be performed for the next block in order, so process flow returns to 71. This cycle is performed until data of any saturation are acquired for all the blocks across the image frame. If the shutter is not depressed, as indicated at 79, the process returns to 61 to acquire data of another preview image. The same processing of the next preview image is performed as described above. Saturation data will typically be retained only for the most recent preview image, for use after the user has depressed the shutter to capture data of a full resolution image that is to be corrected.

Figure 4A:
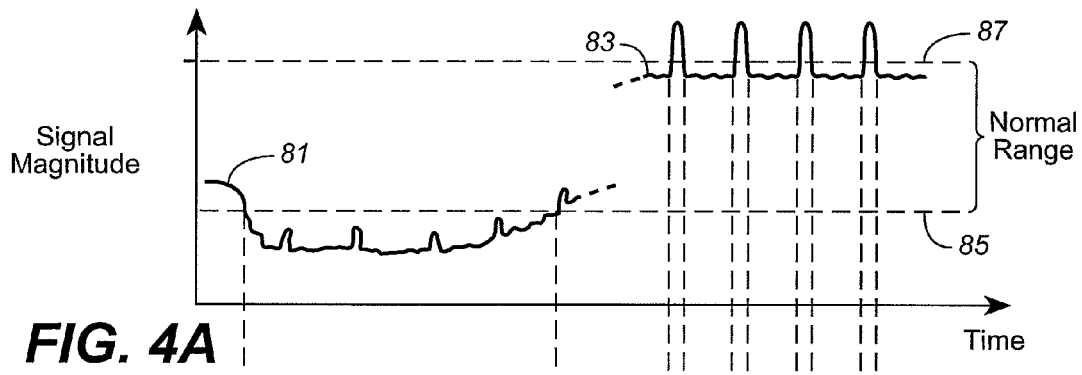
FIGS. 4A and 4B are curves that illustrate examples of operation of the device of FIG. 1 when controlling the saturation of acquired image data.

Reference is made to FIG. 4A to illustrate image saturation and its correction. Two segments 81 and 83 of a signal from the sensor 35 (FIG. 1) of a single image frame are show. The segment 81 goes into negative saturation when it falls below a bottom threshold 85 of a normal range of signal magnitudes to which the processing path is limited by the analog-to-digital converter 39, the bus 41, the signal processor 43, all of them, or perhaps some other bit width limited component of the system. Similarly, the segment 83 becomes positively saturated when going above a maximum level 87 of the normal range. After the analog-to-digital converter 39, a binary signal carried by the bus 41 and within the signal processor 43 has a number of bits representing the normal range of the image signal within a selected resolution. Since the data paths and processing can typically handle only the normal range, any values below or above that range will be represented by a respective one of the lower limit 85 or higher limit 87. Any detail in these portions of the image is thus lost.

Figure 4B:
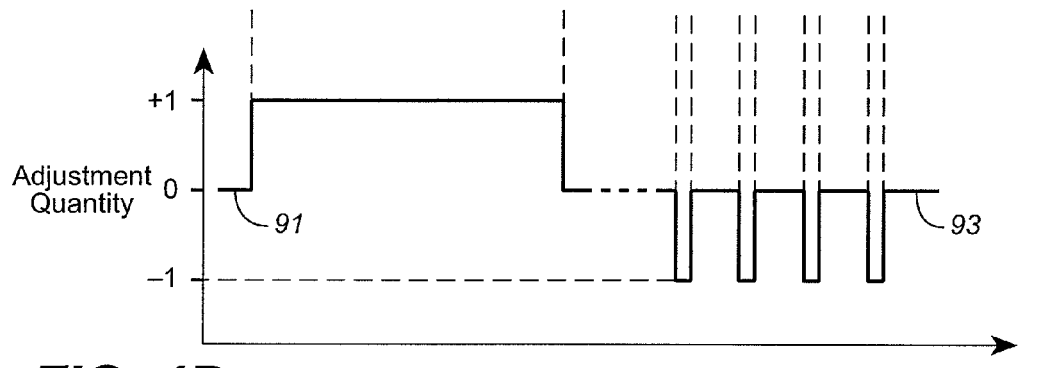

But as a result of the image saturation processing being described herein, a saturated portion of the image signal is shifted in magnitude, by appropriately adjusting the gain of the amplifier 38, back into the normal range. The value of this shift is indicated in FIG. 4B, wherein a curve 91 takes on a +1 value when the signal is negatively saturated, and a curve 93 a −1 value when the signal is positively saturated. These are the gain adjustment values determined, on a pixel-block by pixel-block basis, at 73 and 75 of the process of FIG. 2. They may be temporarily stored in any convenient manner, a table of such values being shown in FIG. 5, where an entry exists at least for every pixel block across the preview image that is positively or negatively saturated.

These stored values are then accessed as a result of the user pressing the shutter button of the camera, at 79 of FIG. 2. Since a number of successive pixels in a row lie in the same block of the preview image, eight in the example of FIG. 3, it is preferable to acquire and process the data in groups of that number of pixels since any necessary gain adjustment will be the same for each pixel of this group. Therefore, at 97 of FIG. 2, a first series of pixels that lie in a row across one of the blocks of FIG. 3 are accessed. At 99 of the process illustrated in FIG. 2, it is determined, by access to the table of FIG. 5 or otherwise, whether there is gain adjustment value stored for those pixels. If there is a +1 gain adjustment, the gain of the amplifier 38 (FIG. 1) is adjusted upwards, at 101. If there is a −1 gain adjustment recorded, the gain is adjusted downwards, at 103. If no gain adjustment value exists for the series of pixels, then no gain adjustment is made.

The magnitudes of the pixels in the identified series are then acquired at 105 after any gain adjustment. This shifts the magnitudes of saturated pixels back into the normal range of the camera signal processing. They are therefore no longer saturated. Detail is restored in the portions of the image that were saturated. The processor 43 keeps track of the gain adjustment values along with the data of the magnitude of each pixel, as indicated at 107, so that the gain adjusted magnitudes may be restored back to their actual values when an image is reconstructed from the acquired data.

This process is performed for the pixels of each series within the preview image blocks. At 109, it is determined whether there are any pixels of the image frame remaining for which data have not yet been acquired. If so, the next series of pixels are selected at 111 and the process beginning with 97 is repeated for them. When data have been acquired for all the pixels of the image frame, the process returns to 61 to acquire and process another preview image in the manner described above.

The process of FIG. 2 has been described to correct for both positive and negative saturation. However, correction for only positive saturation may be preferred for many imaging applications. This has the advantage that the gain adjustment may be represented by a single data bit. Also, negative saturation correction will typically result in the amount of noise in an image to increase in the saturated portion as a result of increasing the signal amplification.

Note that the process implemented by signal processor 43 of FIG. 1 may employ preview images, reduced resolution preview images, or full resolution temporarily stored or pre-captured images. The latter, although memory and processing intensive, may be desirable for images with large amounts of detail, where a wide image data dynamic range needs to be preserved for closely spaced pixels that are alternately near negative saturation, below the range of the digital cameras analog-to-digital converter, and near positive saturation, above the range of the digital camera's analog-to-digital converter. Additionally, it may use image data from a single image, the image to be captured, by analyzing 1 or more pixels preceding a pixel to be captured, and adjusting the gain for the pixel to be captured accordingly.

Second Saturation Control Embodiment

Analog Control

As an alternative to the saturation correction process described with respect to FIG. 2, hardware elements may be added to the device system of FIG. 1. An analog example is shown in FIG. 6, where the elements that are the same as those of FIG. 1 are identified by the same reference numbers. Rather than the processor 43 determining and setting the gain of the amplifier 38 for saturation correction, a comparator 121 is added to the system. One input of the comparator 121 receives the sensor output analog signal in line 37. Another input 123 is connected with a reference voltage that defines a positive saturation threshold, such as the threshold 87 of the example of FIG. 4A.

When the signal in the line 37 exceeds the positive saturation threshold in the line 123, an output 125 of the comparator changes state and causes the gain of the amplifier 38 to decrease by the unit of −1. The comparator 121 is preferably provided with hysterisis so that its output switches back to 0, thereby restoring the gain of the amplifier 38 to its original value, at a lower threshold than that which caused it's output 125 to switch from 0 to −1. The 0 or −1 output of the comparator 121 provides the gain adjustment value that is sent to the processor to be associated with the values of the signal in the bus 41 acquired with those gain adjustments. The combination of these two provides the absolute value of the image signals.

If it is desired to also correct for negative saturation, a second comparator may be added with an output connected to the amplifier 38 to increase its gain when the signal 37 falls below a second threshold voltage applied to this second comparator. The output of this second comparator is then also connected with the signal processor 43.

The gain of the amplifier 38 is shown in FIG. 6 to be adjusted to compensate for saturation. This amplifier gain will commonly also continue to be adjusted by the signal processor 43 through lines 45 (FIG. 1) to set particular image exposure parameters.

It will be noted that the circuit of FIG. 6 adjusts for saturation in real time. There is no need to previously acquire and process preview images for this purpose, although preview images may be used to determine exposure parameters or for other purposes.

Third Saturation Control Embodiment

Digital Control

A real time system may alternatively be implemented digitally, an example of which is shown in FIG. 7. This digital circuit is preferably included as part of the signal processor 43 but can alternatively be implemented separately. A digital comparator 129 receives the output 41 of the analog-to-digital converter 39, and compares it with a digital value 131 that defines the positive saturation threshold and, optionally, a digital value 133 that defines the negative saturation threshold. An output 135 of the comparator 129 carries the 0, +1 and −1 gain adjustment values that are applied to the amplifier 38 to control its gain. There will typically be a one pixel delay between the comparator 129 detecting that the signal in bus 41 has crossed over one of the thresholds and an output 135 that adjusts the gain of the amplifier 38. For example, when a value on the bus 41 of a pixel crosses over the positive saturation threshold 131, the gain of the amplifier 38 is not adjusted to affect the value of that pixel but is adjusted in time to adjust for acquisition of data of a later acquired pixel. The delay may be the time to acquire data of one or more pixels.

The output 135 is also sent to a core processing unit 137 of the processor 43 for association with the signal value output 41 of the analog-to-digital converter. The gain adjustment values used to control the gain during acquisition of the magnitude of individual pixels are associated with those pixels. The absolute values of the pixels are provided by a combination of the two.

The gain of the amplifier 38 is shown in FIG. 7 to be adjusted to compensate for saturation. This amplifier gain will commonly also continue to be adjusted by the signal processor 43 through lines 45 (FIG. 1) to set particular image exposure parameters.

It will be noted that the circuit of FIG. 7 adjusts for saturation in real time. There is no need to previously acquire and process preview images for this purpose, although preview images may be used to determine exposure parameters or for other purposes.

Although the above embodiments have been described with just two thresholds, one for negative saturation and one for positive saturation, the invention is not so restricted. Multiple thresholds, both in the negative and positive directions from a nominal level, may be employed to provide finer control of gray scale renditioning, and the potential of reconstructing a final image with a wider and smoother dynamic range, free of gray and/or color level quantization step aberrations, often called contouring. The use of multiple thresholds may also cause the number of bits representing the gain data to increase.

Further Processing and Use of the Image Signal Data

In each of the three alternative embodiments described above with respect to FIGS. 2, 6 and 7, the character of the image signals received by the camera processor is the same. In each, the value of a particular pixel is represented by the data output of the analog-to-digital converter 39 plus data representing the gain setting of the analog amplifier 38 when data of that pixel were captured. Typically, if the amplifier gain remains at its default level, no gain data are maintained, or only a small amount of data are maintained, thus keeping the amount of gain data low.

Figure 8A:
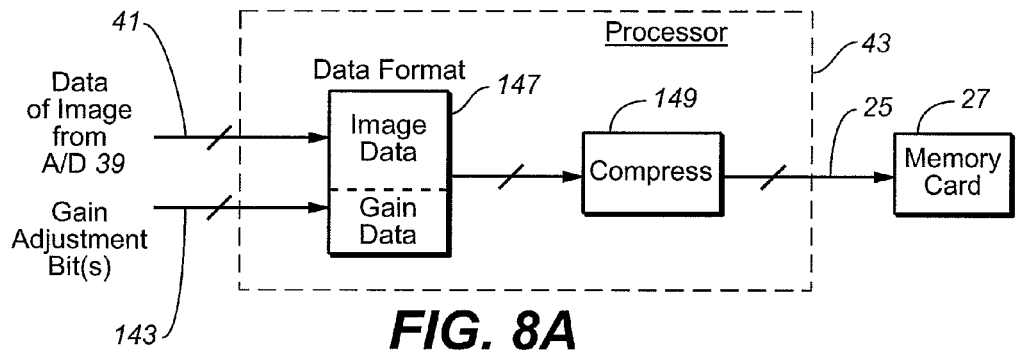
FIG. 8A illustrates a first embodiment of processing digital image data within the device of FIG. 1.

With reference to FIG. 8A, one embodiment is described for storing these data in a raw form in the memory card 27 without image processing within the camera, or output there raw data for some other use. The lines 41 carry the digital output of the analog-to-digital converter 39, and the lines 143 the bit(s) that represent the setting of the gain of the amplifier 38. The image data in lines 41 may optionally be processed with one or more of the conventional image processing algorithms mentioned above, as may be appropriate without use of the associated gain data in lines 143 but the storage of the raw acquired data without image processing is shown. The image luminance data are maintained separate from the amplifier gain data, as indicated at 147.

The data at 147 may be output from the camera in raw form but more typically are compressed within the camera, as indicated at 149, before being stored in the memory card 27 or output from the camera in some other way. The associated gain data may be separately stored on the memory card 27 without compression since the amount of gain data will typically be quite small, while the much larger amount of image luminance data are compressed. But if both are compressed, the popular JPEG algorithm may be used, for example. If so, the gain data may be carried in a "sub-band" where the image data are in a standard JPEG format of three primary colors such as red, green and blue. The image and gain data are then compressed and stored in a manner that allows de-compression with the corresponding standard JPEG algorithm. In this context "sub-band" refers to an ancillary storage location within an image file format structure. This storage location could be physical digital data space that is allocated for extra data that is related to the main imaging data, or could be incorporated into the main imaging digital data itself by the use of, for example, stegographic techniques. For the present invention, this "sub-band" carries gain data, that can be interchangeable referred to as "sub-band data, "ancillary data", "side chain data" or "support data".

Figure 8B:
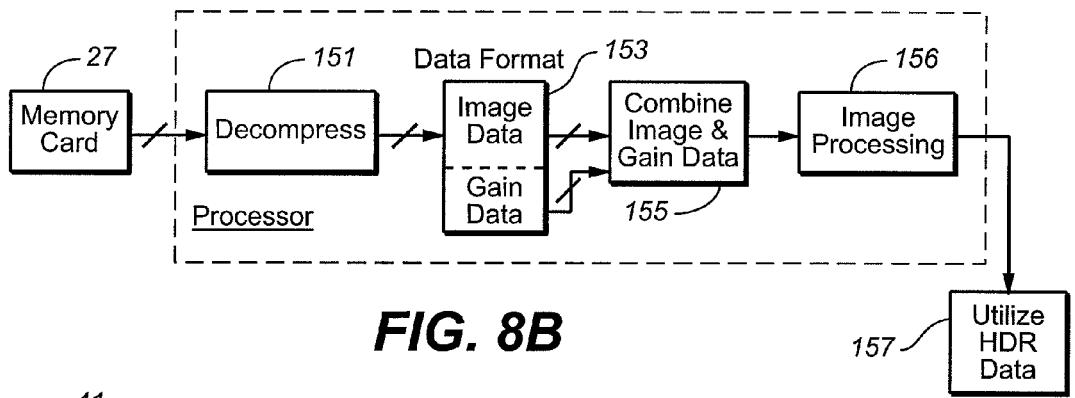
FIG. 8B shows a use of the data processed according to FIG. 8A to form images.

Also note that although the above description calls for both the image and gain data to be compressed, as does the accompanying FIGS. 8A and 8B, compressing of one or both of these data objects is not required to carry out the techniques being described. Traditionally, digital camera imagery is compressed using the JPEG compression and file formats. However, since the addition of gain data for the purpose of high dynamic range image reconstruction is unique to the present invention, no such compression need be considered for gain data "compatibility". Such is not the case for digital image data compatibility, for virtually all commercial digital camera and image processing software implementations are either based on the JPEG image format, or are capable of reading, and/or operating on, an image file adhering to the JPEG standard.

Referring to FIG. 8B, use of this stored data to reconstruct or otherwise utilize the images is shown. The data read from the memory card 27 are decompressed, as indicated at 151. If a JPEG algorithm is used, it is fully decompressed to include the gain data. The image and gain data are then separately available, as indicated at 153. These data are then combined, at 155, to provide image data with a wide dynamic range. The combination of data indicated at 155 involves shifting the value of image data of an individual pixel or group of pixels by the value of any gain data for that pixel or group. For most pixels of an image, there is no such shift since most pixels of a typical picture are not saturated when the camera amplifier 38 is at its normal default gain. The amount of gain data is therefore typically quite small. But for those pixels where the amplifier gain was changed to avoid the effects of saturation, gain data for those pixels are maintained and used at 155 to shift values of their image data. The dynamic range of the image data is therefore selectively expanded from what the camera can normally provide, but only in portions of the image where necessary. The amount of extra data that are stored and processed is therefore kept low.

Prior to displaying, printing, storing or otherwise using the full dynamic range data at 157 of FIG. 8B, the image data may be processed at 156. Since the luminance image data and associated gain data are combined at 155, the high dynamic range data may be processed with standard image processing algorithms. These algorithms are more typically executed within the camera but, in the example of FIG. 8A, the image and gain data are not combined in a manner that allows execution of these standard image processing algorithms so are, in this example, postponed until post-processing in a computer or the like, where the high dynamic range data have been reconstructed from the image and gain data.

Figure 9A:
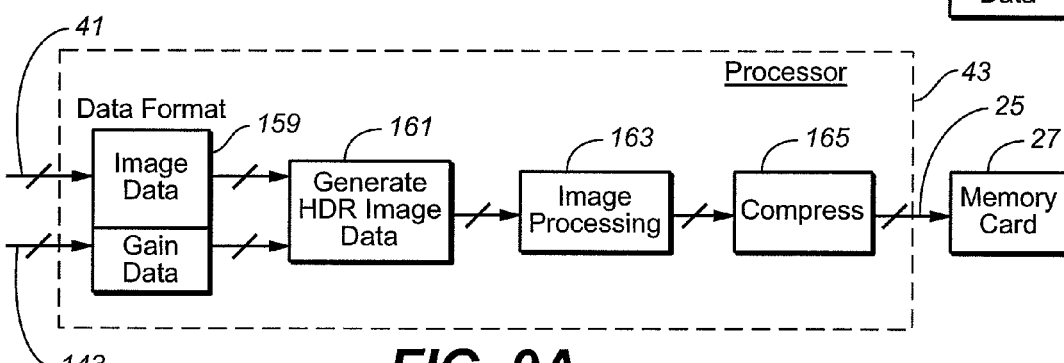
FIG. 9A illustrates a second embodiment of processing digital image data within the device of FIG. 1.
Figure 9B:
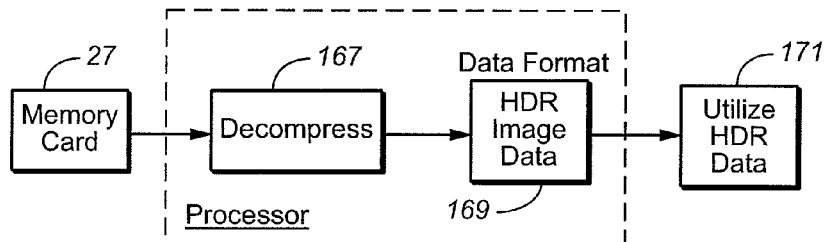
FIG. 9B shows a use of the data processed according to FIG. 9A to form images.

FIGS. 9A and 9B illustrate a different way to process and utilize HDR image data than shown in FIGS. 8A and 8B. Image and gain data 159 are combined at 161 to generate data of a HDR image. These full dynamic range image data include data of image locations that have not been shifted in gain, plus image data acquired from regions of the image where the gain was changed in order to avoid saturation after their luminance range is shifted according to the gain values associated those image data. These image data may then be processed at 163 with the standard image processing algorithms described above. Prior to storage in the memory card 27, or alternatively to some other output of the camera, the processed HDR image data may be compressed, at 165. Alternatively, the uncompressed processed HDR image data may be stored or output.

The use of the camera output data from FIG. 9A is straight forward, as shown in FIG. 9B. A processor in a personal computer or some other host utilization device first decompresses the stored data, as indicated at 167, if the data have been stored in a compressed form. The HDR image data at 169 result, and thus may be viewed, printed or utilized in some other manner, as indicated at 171.

A primary advantage of the technique illustrated in FIG. 9A is that the data after 161 represent an image frame within the camera in a full dynamic range with a single set of data. This is therefore similar to how existing cameras represent image data, except that the dynamic range is considerably expanded. But the cost of providing this ability is that each image is represented by a large amount of data, which increases the internal memory requirements and amount of processing that needs to be performed. A camera utilizing the technique of FIG. 9A still has the advantage, as does the technique of FIG. 8A, of using a standard low cost analog-to-digital converter 39 (FIG. 1), such as one outputting 8-bits, but with the ability to generate the same HDR image data that a 12-bit, 16-bit, 24-bit or larger A/D converter 39 could provide, if the gain factor of the amplifier 38 is used in the manner described above.

De-mosaicing, one of the standard image processing techniques used in cameras when the photosensor 35 (FIG. 1) is a type that uses the Bayer grid, may be performed directly at 163 of FIG. 9A. Of course, if the photosensor 35 is the Fovion type, the image data does not then need to be de-mosaiced. In addition to the examples of de-mosaicing, white balance and noise reduction mentioned above, other image processing and enhancement may be performed at 163 as is typically carried out in cameras or other image acquisition devices. Other processing algorithms that may be implemented at this stage include those for digital lighting, color mapping and highlight recovery.

Figure 10:
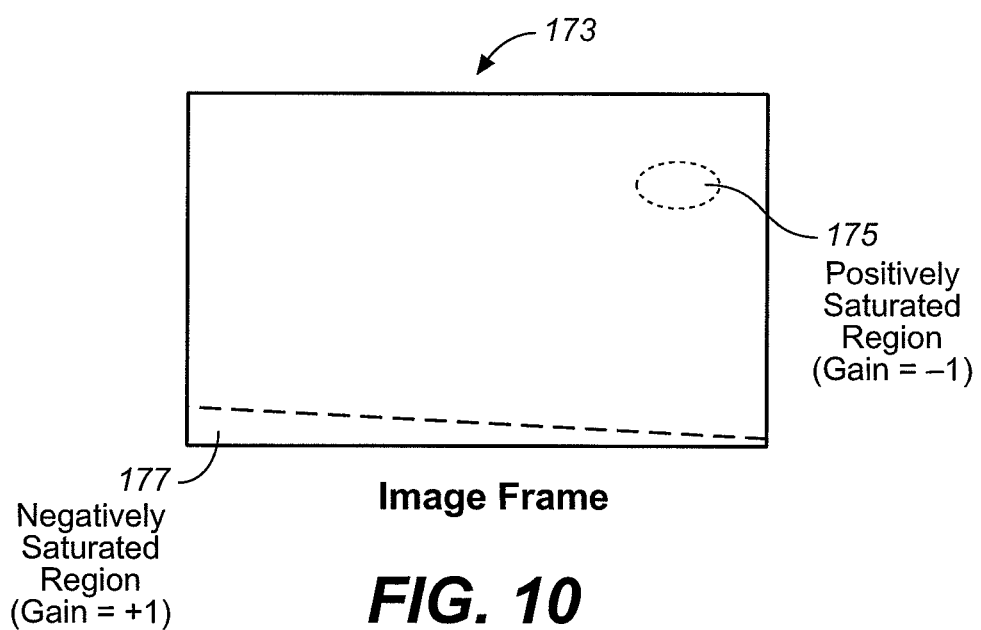
FIG. 10 shows an image having two saturated regions, such as represented by the curves of FIG. 4A.

FIG. 10 shows an example image frame 173 that has a region 175 that would otherwise be positively saturated, so thus has a negative gain adjustment, and region 177 that would otherwise by negatively saturated, so thus has a positive gain adjustment. In this case, it is only the raw image data of the regions 175 and 177 that are acquired after making an adjustment in the camera gain. Although only two saturated portions of the image are illustrated in FIG. 10, images may have more such distinct areas, or only one. But the total amount of area of a typical image that is saturated will usually be quite low since the camera automatically sets the exposure level to an average luminance of the image being recorded.

Data of the gain adjusted regions of the image, such as regions 175 and 177 of FIG. 10, can be processed separately from the data of the rest of the image that do not have associated gain adjustment data. The processed data of all the different image regions are then combined to produce an image data set containing dynamic range information that is greater than that of the system's intrinsic dynamic range. This separate regional processing approach may be applied to processing actions such as de-mosaicing, white balance compensation, digital lighting compensation, noise reduction and highlight recovery. This approach is different than that those used in the example of FIGS. 8A and 8B, where the image processing 156 is performed in post processing, and in the example FIGS. 9A and 9B, where the image processing 163 is performed in the camera, both after the image and gain data have been combined. In the technique being described with respect to FIG. 10, on the other hand, data of the separate regions are processed without first having to reconstruct data of a full dynamic range image. The gain adjustment data associated with the image data of these distinct regions are generally not necessary to carry out such image processing. It is only necessary, when using this image processing technique, that the data of each different gain adjusted region of the image be independently processed.

If an image processing algorithm applied on a regional basis, as described with respect to FIG. 10, operates on blocks of pixel data, some special processing may be necessary for data of the edges of the distinct regions in order to knit the image portions together without the boundary appearing in the image. An appropriate interpolation between data on opposite sides of the boundary between adjacent regions may be performed as part of executing an algorithm that utilizes such data. But it is preferred that the image data be combined with their associated gain data for a few pixels on either side of the boundary, as necessary for execution of the image processing algorithm, which then uses this full dynamic range data in the limited boundary region. The gain data are used by the image processing for only this limited purpose. This does therefore increase the amount of data that the camera must process but not significantly. The internal bus width, the processing capability or internal memory need not be expanded. A double precision memory may be used, and the high dynamic range data of individual pixels represented, for example, by two 8-bit words in an 8-bit wide processing system of the camera.

The image data processed for each region are then combined with their associated regional gain data for additional processing steps. Such additional processing steps include, but are not limited to, image tone mapping, conversion to a standard JPEG format image, and the creation of a full dynamic range HDR image. The use of image data processed in this way with image tone mapping are described below with respect to further examples of FIGS. 11A and 13A.

Figure 11A:
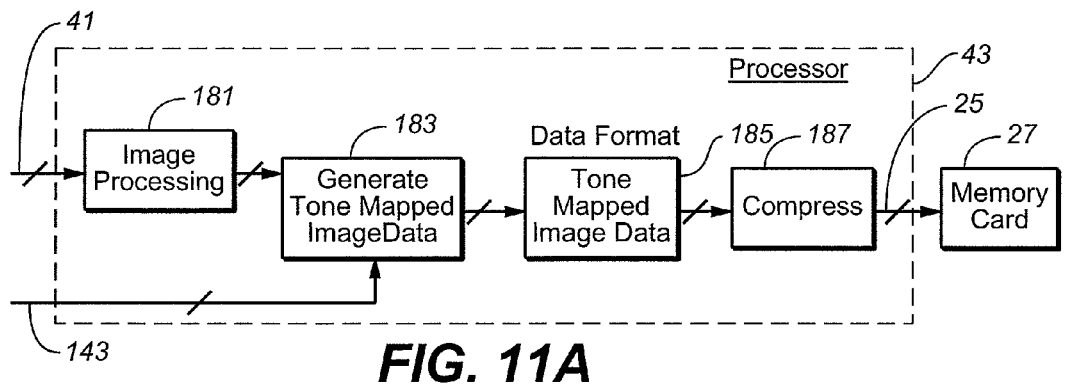
FIG. 11A illustrates a third embodiment of processing digital image data within the device of FIG. 1.

FIG. 11A illustrates a different technique for the further processing of data in the camera than do FIGS. 8A and 9A. Rather than storing the image data and gain data separately, data of tone mapped images are calculated at 183 from both the image data and the gain data. In this example, image processing as described above with respect to FIG. 10 is first performed at 181 before data of tone mapped images are performed. Images formed from the data of the toned mapped version will have less dynamic range than those from the HDR image data of FIGS. 8B and 9B but they are viewable with details of any regions that would otherwise be saturated being visible. Tone mapping is widely used in computer graphics and other imaging applications. Tone mapped image data are generated at 183 by adjusting the values of individual pixels in the incoming image data 41 proportionately across a defined maximum dynamic range. The determination of the individual pixel values includes use of any gain data in the lines 143 that are associated with those pixels. The gain value for a pixel affects where its value lies in the defined dynamic range of the tone mapped image.

Figure 12A:
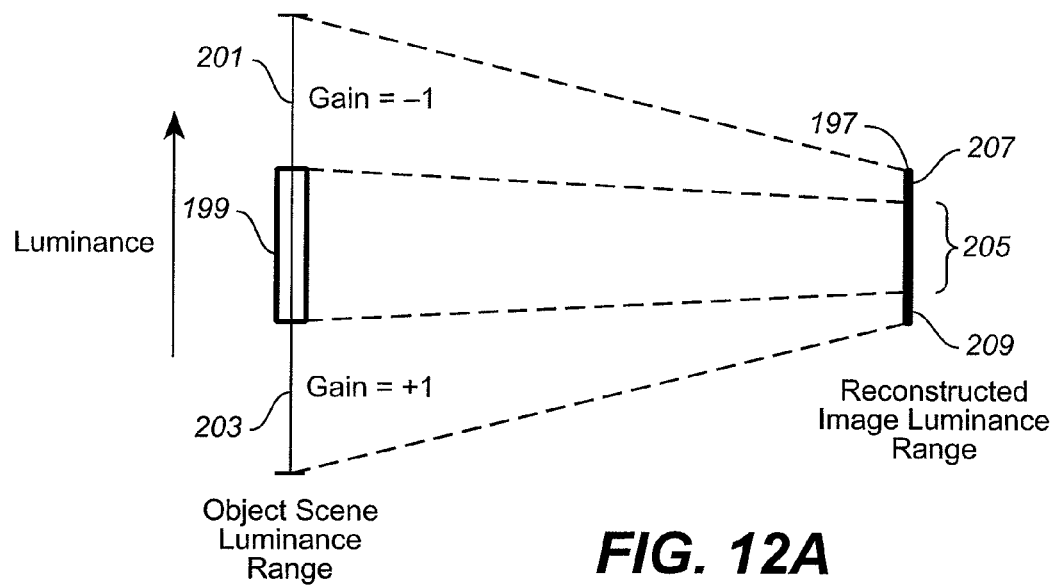
FIGS. 12A and 12B show two examples of the range of luminance of an object scene that is reproduced as a tone mapped image.

Although displaying more image details in the highlight and shadow regions of the image, the defined dynamic range of the tone mapped image need be no greater than the dynamic range of the acquisition system without the gain adjustment being made, and will be less than the resulting dynamic range of the HDR data of FIGS. 8B and 9B. The pixels of the tone mapped images may then be represented by the same number of bits as the output of the A/D converter 39 (FIG. 1) and thereby carried by the same internal bus and processed in the same manner within the processor 43. This is illustrated in FIG. 12A, wherein a luminance range (vertically) 197 of a tone mapped image is the same as a luminance range 199 that the number of bits of the output of the A/D converter 39 can express. That A/D range is effectively tripled in the illustration of FIG. 12A by a −1 gain adjustment value shifting this window upward to 201 to capture data of any otherwise positively saturated image regions, and downward to 203 by a +1 gain adjustment to capture data of any otherwise negatively saturated image regions.

The dynamic range portion 199 is reduced somewhat to a portion 205 of the dynamic range 197 of the tone mapped image by proportionately adjusting the values of luminance of the pixels of the image within the luminance range 199 to fit within the range 205. The range 205 is chosen to be greater than fifty percent of the total image dynamic range 197, since the vast majority of the image area will typically be within this range, and less than ninety percent, in order to leave some range for details of any image region(s) that would otherwise be saturated. A portion 207 of the tone mapped image carries the luminance variations of the range 201 of the luminance from the object scene, and a portion 209 carries the luminance variations of the range 203.

Figure 12B:
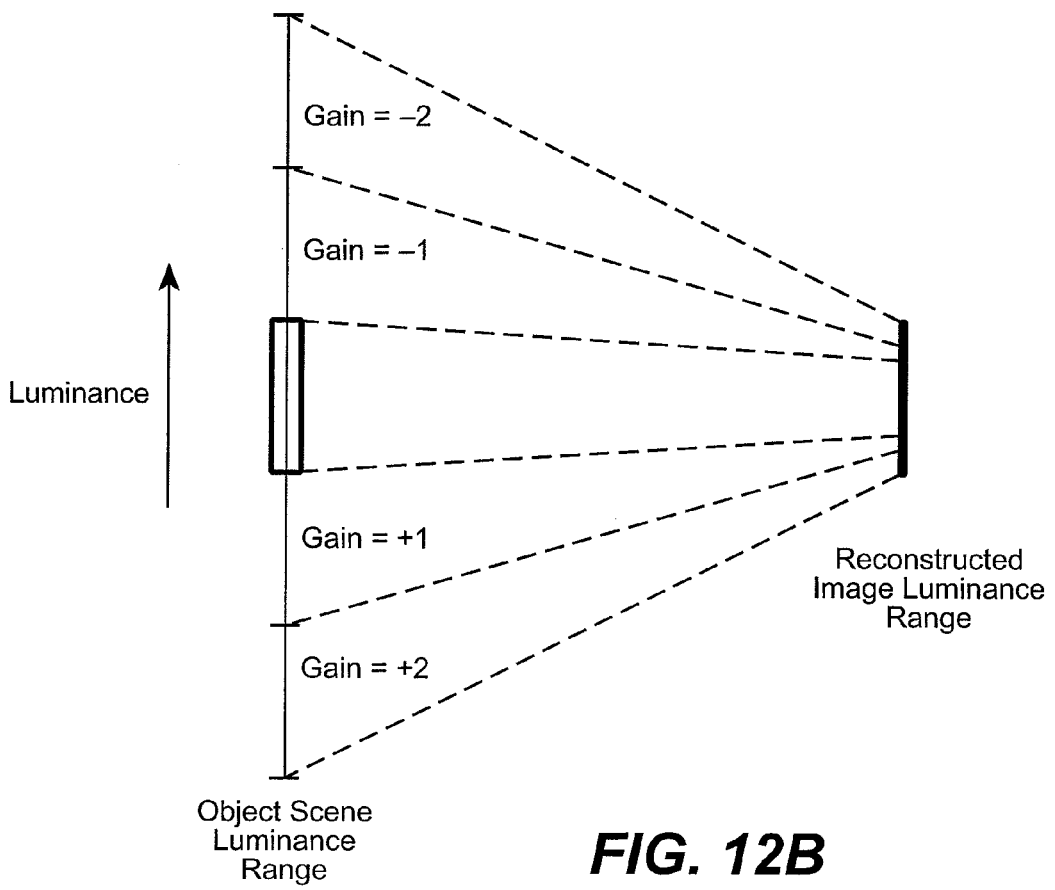

Although the examples given so far adjust the camera system gain by only one or two increments, this has been to make the operational principles easier to explain and understand. A typical system will have more than two adjustable gain increments. FIG. 12B shows four such increments, two positive and two negative. At the high end, the gain adjustment can be, for example, represented by 8-bits which provides up to 256 different gain adjustment values. FIGS. 12A and 12B illustrate the characteristics of tone mapped images that make their generation and use particularly advantageous for digital cameras.

The form of the data obtained according to FIG. 11A, as indicated at 185, is the tone mapped image data alone. The gain adjustment data need not be stored in the memory card 27 or otherwise output from the memory, in this example. The tone mapped data 185 are then typically compressed at 187 before storage on the memory card 27. A standard JPEG compression algorithm may be used on the tone mapped image.

There are several advantages of processing and storing data in the manner described with respect to FIG. 11A. One is that the tone mapped image may be utilized and displayed as the final image, particularly on devices having limited dynamic range. No special processing is necessary to view such images. Such an image is compatible with current cameras, displays, printers and other image data processing equipment. A display on the camera may use the tone mapped image data to display images without any significant amount of additional processing.

Figure 11B:
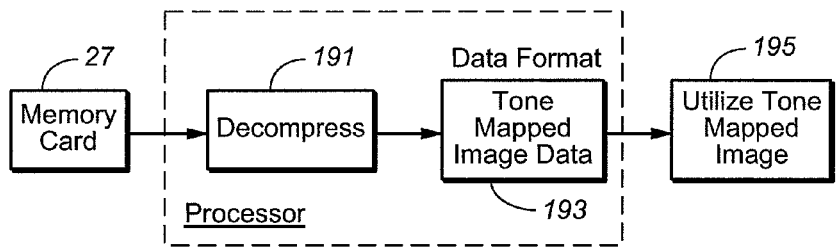
FIG. 11B shows a use of the data processed according to FIG. 11A to form images.

FIG. 11B illustrates use of the stored tone mapped image data directly. The tone mapped image data are read from the memory card 27 and decompressed at 191. The tone mapped image data are then obtained by themselves, as indicated at 193, and are utilized by a display, printer or some other device 195. Good quality images within a defined dynamic range are provided. Details are then visible in any areas of the image that would otherwise have been a uniform white or black because of saturation.

Figure 13A:
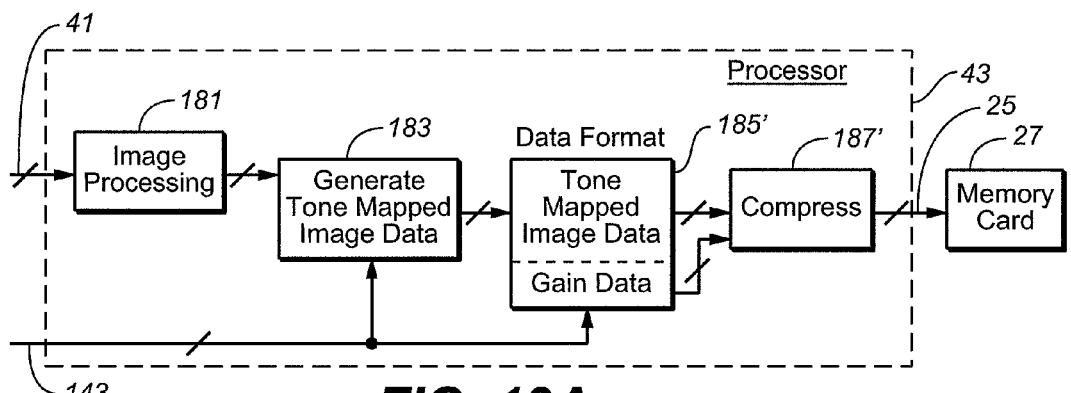
FIG. 13A illustrates a fourth embodiment of processing digital image data within the device of FIG. 1.

Another advantage of the tone mapped image is that an image with full dynamic range may be reconstructed from the tone mapped image data when the gain data are also used, if this is desired. HDR images may then be displayed or otherwise utilized with equipment that itself has a wide dynamic range. FIG. 13A shows the processing and storage of both the tone mapped data and the gain data, as a variation of the processing shown in FIG. 11A. The difference is that the data 185' includes the gain data, and the compression 187', if used, will take that into account. Whether or not the separate gain data are compressed, they may, in most cases, be carried within a sub-band of a JPEG compression algorithm. This is because, as previously stated, most image pixels have been adjusted to fall within the digital camera's window of its analog-to-digital converter, bus width and processor. Therefore, most image pixels will typically not be associated with separate gain data, and the amount of gain data generated is therefore relatively small. The compressed data are then stored on a memory card 27 or output from the camera in some other manner.

Figure 13B:
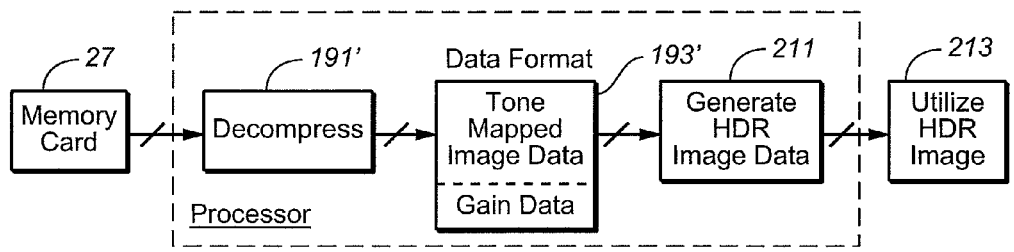
FIG. 13B shows a use of the data processed according to FIG. 13A to form images.

But if the gain data are read from the memory card 27 and used, wide dynamic range image data may be obtained, as illustrated in FIG. 13B. The stored data are fully decompressed, at 191, resulting in the data indicated at 193'. At 211, the tone mapped image data and gain data are processed together to provide data of the image over a wide dynamic range, which are then displayed or otherwise utilized at 213. The processing 211 may first reverse the processing 181 of FIG. 13A that generated the tone mapped image data. The original image data and gain data are then obtained. These data may then be combined in the same manner as in 155 of FIG. 8B.

Processing and Use of a Similar Form of Image Data

In the embodiments described in the above-referenced application Ser. No. 11/467,993, the dynamic range of an image capturing system is expanded by representing the luminance of individual pixels with a value of the luminance outputted by individual photosensor elements plus the duration to which the photosensor element was exposed that resulted in that luminance value. Since the average luminance of an image is set in digital cameras and other image capturing devices to be within the non-saturated response region of its photosensor, most elements of the photosensor are exposed for the same maximum time without becoming saturated. The luminance values of most image pixels are simply the output at the end of the maximum exposure time. But when the photosensor element becomes saturated before the end of the maximum exposure time, the output measured at an earlier time before the element became saturated is used to extrapolate to final value that is beyond the saturated value. The actual luminance striking the photosensor element is calculated in this manner.

This technique allows detail to be visible in positively saturated portions of images that would otherwise be reconstructed as all white. An image is represented by the outputs of all the photosensor elements plus, in the case of those that become saturated, a representation of the time less than the maximum exposure time at which the output was captured. In a specific example, the measured luminance value is increased beyond the saturated level by being multiplied by a ratio of the maximum exposure time divided by the actual exposure time. This ratio, or a corresponding quantity, is a parameter that is recorded along with the measured luminance values to represent the image.

Image data in this form may be processed and utilized in ways similar to the examples described above with respect to FIGS. 8A-13B. In those examples, images are represented by luminance data plus a gain parameter. The luminance data are often initially processed by themselves and then later combined with the associated gain data. Similarly, those same techniques may be used with image data in the format described in aforementioned application Ser. No. 11/467,993, namely luminance data plus an exposure time parameter. Indeed, the exposure time ratio defined immediately above has many of the same attributes as the gain parameter utilized in the embodiments described earlier. In one case, the actual image is reconstructed in its portions that would otherwise be saturated by multiplying the measured luminance value by the gain, and in the other by multiplying the measured luminance value by the exposure time ratio.

Conclusion

Although the various aspects of the present invention have been described with respect to exemplary embodiments thereof, it will be understood that the present invention is entitled to protection within the full scope of the appended claims.

It is claimed:

1. A method of processing electronic signals of at least one optical image that has a dynamic range of magnitudes outside of a predefined range of magnitudes, comprising:
   acquiring preview image data having a reduced resolution that is less than a resolution of the at least one optical image, wherein the preview image data is acquired to set gain for acquiring image signals of the at least one optical image;
   adjusting magnitudes of the image signals outside of the predefined range by quantities selected to allow measurement of the adjusted signals within the predefined range, the quantities selected based on preview image data acquired prior to the image signals,
   representing the image signals by quantities representative of magnitudes of the image signals within the predefined range, and magnitudes of the adjusted signals within the predefined range along with their associated adjustment quantities,
   calculating data for a tone mapped image of the at least one optical image, by a processor, from the quantities representative of the magnitudes of the image signals within the predefined range and the magnitudes of the adjusted signals within the predefined range and their associated adjustment quantities, and
   outputting, by the processor, data of the tone mapped image via an output, wherein the data of the tone mapped image is further generated based on data generated by the analog-to-digital converter and data associated with photo exposure time of the image signals.

2. The method of claim 1, additionally comprising reconstructing at least one image from the quantities representative of the magnitudes of the image signals within the predefined range, and the magnitudes of the adjusted signals within the predefined range along with their associated adjustment quantities.

3. The method of claim 1, additionally comprising storing in a non-volatile memory the quantities representative of the magnitudes of the image signals within the predefined range, and the magnitudes of the adjusted signals within the predefined range and their associated adjustment quantities.

4. The method of any one of claims 1-3, wherein the associated adjustment quantities include a gain of the electronic signals.

5. The method of any one of claims 1-3, wherein the associated adjustment quantities include quantities related to a time of exposure.

6. The method of claim 1, additionally comprising displaying an image from the tone mapped image data.

7. The method of claim 1, additionally comprising reconstructing data of an image having a wide dynamic range by combining the tone mapped image data with the adjustment quantities associated with the adjusted signals.

8. The method of claim 7, additionally comprising displaying an image from the reconstructed data.

9. The method of claim 1, wherein the predefined range of magnitudes is defined by a limitation of a system on which the signal processing takes place.

10. The method of claim 1, additionally comprising, prior to adjusting magnitudes of the signals, determining whether the magnitudes of the signals are outside the predefined range, and, if so, thereafter determining their associated adjustment quantities.

11. The method of claim 10, wherein determining whether the magnitudes of the signals are outside the predefined range of magnitudes includes referencing stored signals of a prior image.

12. The method of claim 11, wherein the stored signals of a prior image include stored signals of preview images having a resolution that is less than a resolution of the magnitudes of the adjusted signals within the predefined range.

13. The method of claim 10, wherein determining whether the magnitudes of the signals are outside the predefined range of magnitudes includes referencing signals of one or more pixels within the same image.

14. The method of claim 10, wherein determining whether the magnitudes of the signals are outside the predefined range of magnitudes includes comparing the magnitudes of the signals with at least one reference magnitude.

15. The method of claim 1, wherein the signals that represent the magnitudes of individual pixels of the optical image and the adjustment quantities are associated with the individual pixels.

16. The method of claim 1, wherein the signals that represent the magnitudes of individual pixels of the optical image and the adjustment quantities are associated with blocks that individually include a plurality of individual pixels.

17. The method of claim 1, additionally comprising processing the images by utilizing at least one image processing algorithm with magnitudes of the image signals within the predefined range, and magnitudes of the adjusted signals within the predefined range, and thereafter combining the results.

18. The method of claim 17, additionally comprising thereafter employing the associated predefined range adjustment quantities with the combined results.

19. The method of claim 17, wherein combining the results of the processes includes employing the associated predefined range adjustment quantities.

20. The method of claim 17, wherein the at least one image processing algorithm includes a de-mosaicing algorithm.

21. The method of claim 17, wherein the at least one image processing algorithm includes a white balance algorithm.

22. The method of claim 17, wherein the at least one image processing algorithm includes a digital lighting algorithm.

23. The method of claim 17, wherein the at least one image processing algorithm includes a color mapping algorithm.

24. The method of claim 17, wherein the at least one image processing algorithm includes a noise reduction algorithm.

25. The method of claim 17, wherein the at least one image processing algorithm includes a highlight recovery algorithm.

26. The method of claim 17, wherein the at least one image processing algorithm includes a tone mapping algorithm.

27. The method of claim 17, wherein the at least one image processing algorithm includes a JPEG compression algorithm.

28. The method of claim 17, wherein the at least one image processing algorithm includes a HDR image reconstruction algorithm.

29. A method of acquiring data of at least one image, comprising:
 acquiring preview image data having a reduced resolution that is less than a resolution of data for the at least one image, wherein the preview image data is acquired to set gain for acquiring image signals of the image;
 directing the image onto a photosensor that generates an analog signal representing magnitudes of pixels within the image;
 passing the photosensor analog signal through a controllable gain amplifier that provides an output of a level controlled analog signal;
 applying the level controlled analog signal to an analog-to-digital converter having a defined input range window and which outputs digital signals representing magnitudes of the level controlled analog signal within the window;
 determining whether the level controlled analog signal has a magnitude outside the window, and, if so, adjusting the gain of the variable gain amplifier to maintain the magnitude level controlled analog signal within the input range window of the analog-to-digital converter, the gain selected based on preview image data acquired prior to the image;
 recording both the digital output signals of the analog-to-digital converter and associated values of gain of the controllable gain amplifier in a manner to be useable to recreate the image with a range in excess of that of the window;
 calculating data for a tone mapped image of the at least one image, by a processor, from quantities representative of magnitudes of the level controlled analog signal within the input range window and magnitude of the adjusted signals within the input range window and their associated adjustment quantities; and
 outputting, by the processor, data of the tone mapped image via an output, wherein the data of the tone mapped image is further generated based on data generated by an analog-to-digital converter and data associated with photo exposure time of the at least one image.

30. The method of claim 29, wherein determining whether the level controlled analog signal has a magnitude outside the window and adjusting the gain of the variable gain amplifier are both carried out for magnitudes of individual pixels of the photosensor analog signal.

31. The method of claim 29, wherein determining whether the level controlled analog signal has a magnitude outside the window and adjusting the gain of the variable gain amplifier are both carried out for magnitudes representing individual groups of pixels that include a plurality of adjacent pixels.

32. The method of claim 29, wherein determining whether the level controlled analog signal has a magnitude outside the window includes comparing the photosensor analog signal with at least one analog reference level.

33. The method of claim 29, wherein determining whether the level controlled analog signal has a magnitude outside the window includes comparing the output digital signals of the analog-to-digital converter with at least one digital reference level.

34. A method of processing electronic signals of at least one optical image that has a dynamic range of magnitudes outside of a predefined range of magnitudes, comprising:
 acquiring preview image data having a reduced resolution that is less than a resolution of the at least one optical image, wherein the preview image data is acquired to set gain for acquiring image signals of the at least one optical image;
 adjusting magnitudes of the image signals outside of the predefined range by quantities selected to maintain the adjusted signals within the predefined range during acquisition of them, the quantities selected based on preview image data acquired prior to the image signals;
 processing the image signals by utilizing at least one image processing algorithm with magnitudes of the image signals within the predefined range, and with quantity adjusted magnitudes of the image signals outside of the predefined range, and thereafter combining the results;
 calculating data for a tone mapped image of the at least one optical image, by a processor, from the quantities representative of the magnitudes of the image signals within the predefined range and the magnitudes of the adjusted signals within the predefined range and their associated adjustment quantities; and outputting, by the processor, data of the tone mapped image via an output, wherein the data of the tone mapped image is further generated based on data generated by an analog-to-digital converter and data associated with photo exposure time of the image signals.

35. The method of claim 34, wherein the associated predefined range adjustment quantities are employed subsequent to the combining the results.

36. The method of claim 34, wherein the associated predefined range adjustment quantities are employed during the combining the results.

37. The method of claim 34, wherein the associated predefined range adjustment quantities include an image signal gain.

38. The method of claim 34, wherein the associated predefined range adjustment quantities include a quantity related to a time of exposure during acquisition of the image signals.

39. The method of claim 34, wherein the image processing includes use of a de-mosaicing algorithm.

40. The method of claim 34, wherein the image processing includes use of a white balance algorithm.

41. The method of claim 34, wherein the image processing includes use of a noise reduction algorithm.

42. The method of claim 34, wherein the image processing includes use of a color mapping algorithm.

43. The method of claim 34, wherein the image processing includes use of a digital lighting algorithm.

44. The method of claim 34, wherein the image processing includes use of a highlight recovery algorithm.

45. The method of claim 34, wherein the image processing includes use of a tone mapping algorithm.

46. The method of claim 34, wherein the image processing includes use of a JPEC compression algorithm.

47. The method of claim 34, wherein the image processing includes use of a HDR image reconstruction algorithm.

48. The method of claim 34, additionally comprising reconstructing at least one image from quantities representative of the magnitudes of the processed image signals within the predefined range, and the magnitudes of the processed adjusted signals within the predefined range along with their associated adjustment quantities.

49. The method of claim 34, additionally comprising storing in a non-volatile memory quantities representative of the magnitudes of the processed image signals within the predefined range, and the magnitudes of the processed adjusted signals within the predefined range and their associated adjustment quantities.

50. The method of claim 34, wherein the predefined range of magnitudes is defined by a limitation of a system on which the signal processing takes place.

51. The method of claim 34, wherein the signals that represent magnitudes based upon individual pixels of the optical image and the adjustment quantities are associated with the individual pixels.

52. The method of claim 34, wherein the signals that represent magnitudes based upon individual pixels of the optical image and the adjustment quantities are associated with blocks that individually include a plurality of individual pixels.

53. A method of acquiring and processing data of an optical image from a source, comprising:

acquiring preview image data having a reduced resolution that is less than a resolution of data for the optical image, wherein the preview image data is acquired to set gain for acquiring the data of the optical image from the source;

dividing a continuum of potential magnitudes from the source into a plurality of discrete ranges;

representing magnitudes from the source by data of values within individual ranges and associated data that identify the ranges in which the data of values lie, the associated data selected based on preview image data acquired prior to the data for the optical image from the source;

individually processing the data of values within the individual ranges without regard to the identity of the ranges in which they lie;

thereafter combining the processed data from multiple ranges;

calculating data for a tone mapped image of the optical image, by a processor, from quantities representative of the magnitudes of data for the optical image within an individual range and the magnitudes of the data of values within the individual range and associated adjustment quantities; and outputting, by the processor, data of the tone mapped image via an output, wherein the data of the tone mapped image is further generated based on data generated by an analog-to-digital converter and data associated with photo exposure time of the data for the optical image.

54. The method of claim 53, wherein combining the processed data additionally includes combining the data with the processed data with the identity of the ranges in which the data lie.

55. The method of claim 53, wherein the data are acquired from a source including a photosensor having an output of magnitudes that represent a luminance of an optical image cast onto the photosensor.

56. The method of claim 53, wherein dividing the continuum of potential magnitudes from the source includes defining a plurality of discrete ranges of magnitudes that are the same, the discrete ranges of magnitudes being selected to be within the processing capabilities of a device that processes the data of values within the individual ranges.

57. A digital camera, comprising:

a photosensor having an electrical output proportional to a luminance of an optical image incident thereon;

an optical system that casts an optical image of an object scene onto the photosensor;

an analog-to-digital converter that generates digital data from an analog signal within a defined window of values at an input thereof;

an adjustable gain amplifier receiving the analog signal as an output of the photosensor and connected with the input of an analog-to-digital converter, the gain of the amplifier being controlled to maintain an input to the analog-to-digital converter within the window thereof, the gain selected based on preview image data acquired prior to acquiring the analog signal of the optical image of the object scene; and a processor that utilizes both the data generated by the analog-to-digital converter and data of the gain of the amplifier to generate data to represent the luminance of the optical image cast onto the photosensor, wherein the processor executes instructions that enable actions, including:

acquiring preview image data having a reduced resolution that is less than a resolution of the analog signal of the optical image, wherein the preview image data is acquired to set gain for the amplifier that is acquiring the analog signal of the optical image;

calculating data for a tone mapped image from the quantities representative of magnitudes of the optical image's analog signals within a predefined range for the window of values and the magnitudes of the adjusted analog signals within the predefined range and their associated adjustment quantities; and outputting data of the tone mapped image via an output, wherein the data of the tone mapped image is further generated based on data generated by an analog-to-digital converter and data associated with photo exposure time of the optical image's analog signals.

58. The camera of claim 57, additionally comprising an output through which the data of the image cast onto the photosensor are passed, including data of the gain of the amplifier.

59. The camera of claim 57, wherein the data of tone mapped images are passed through the data output without data of the gain of the amplifier.

* * * * *